United States Patent
Yamazaki

(10) Patent No.: US 6,181,501 B1
(45) Date of Patent: *Jan. 30, 2001

(54) INFORMATION RECORDING AND REPRODUCING APPARATUS HAVING AN IMPROVED HIGH FREQUENCY CHARACTERISTIC FOR A REPRODUCTION SIGNAL

(75) Inventor: Yuichiro Yamazaki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/992,558

(22) Filed: Dec. 17, 1997

(30) Foreign Application Priority Data

May 26, 1997 (JP) .................................... 9-135119

(51) Int. Cl.$^7$ ................... G11B 5/02; G11B 5/09
(52) U.S. Cl. ................................... 360/67; 360/46
(58) Field of Search ........................ 360/46, 66, 67

(56) References Cited

U.S. PATENT DOCUMENTS

| | | | |
|---|---|---|---|
| 4,159,489 | * 6/1979 | Braitberg | 360/65 |
| 5,384,671 | * 1/1995 | Fisher | 360/51 |
| 5,426,542 | * 6/1995 | Smith | 360/67 |
| 5,694,083 | * 12/1997 | Umeyama et al. | 360/67 |

FOREIGN PATENT DOCUMENTS

| | | |
|---|---|---|
| 55-153108 | 11/1980 | (JP) . |
| 58-35704 | 3/1983 | (JP) . |
| 59-105786 | 6/1984 | (JP) . |
| 5-129853 | 5/1993 | (JP) . |
| 2-152874 | 6/1993 | (JP) . |
| 8-255449 | 10/1996 | (JP) . |

* cited by examiner

Primary Examiner—W. Young
Assistant Examiner—Regina Y. Neal
(74) Attorney, Agent, or Firm—Greer, Burns & Crain, Ltd.

(57) ABSTRACT

A magnetic recording and reproducing apparatus having a reproducing circuit structure which improves a high frequency characteristic of a reproduction signal output from a read head. The read head reads information recorded on a recording medium. A first amplifying circuit amplifies a reproduction signal generated by the read head. A second amplifying circuit, which comprises a high-frequency amplifying circuit, amplifies the reproduction signal amplified by the first amplifying circuit in a high-frequency amplifying manner. The first amplifying circuit and the second amplifying circuit together constitute a cascode amplifier. A third amplifying circuit amplifies the reproduction signal amplified by the second amplifying circuit. A reproducing circuit reproduces the reproduction signal amplified by the third amplifying circuit.

21 Claims, 10 Drawing Sheets

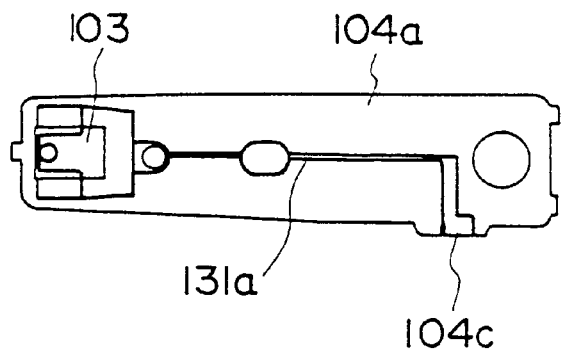
FIG. 8A
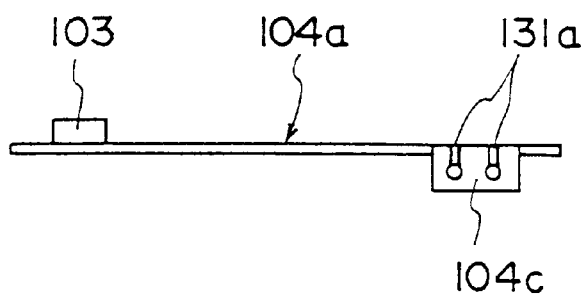
FIG. 8B
FIG. 9
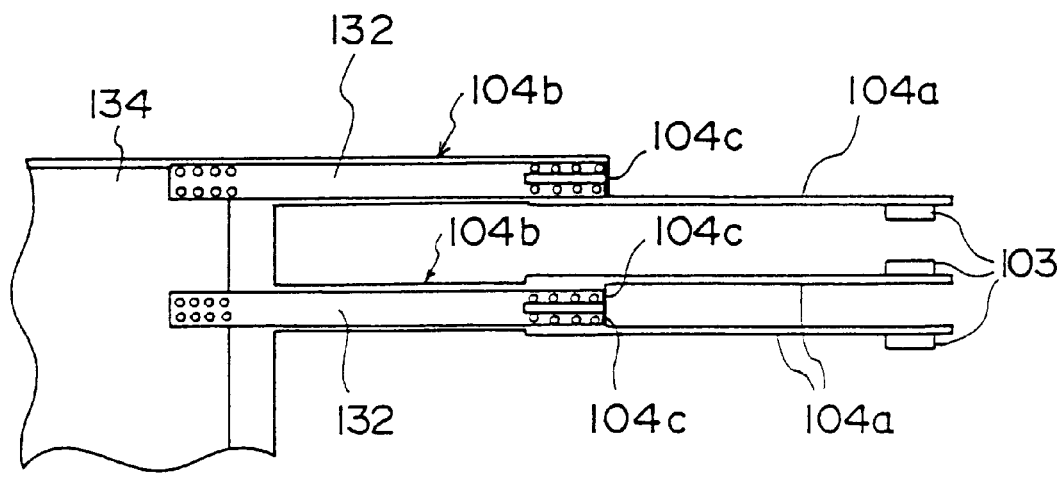

INFORMATION RECORDING AND REPRODUCING APPARATUS HAVING AN IMPROVED HIGH FREQUENCY CHARACTERISTIC FOR A REPRODUCTION SIGNAL

BACKGROUND OF THE INVENTION

1. Field of the Invention

The present invention generally relates to an information recording and reproducing apparatus and, more particularly, to a reproducing circuit for a magnetic recording and reproducing apparatus which amplifies a reproduction signal generated by a reproducing head and supplies the amplified reproduction signal to a signal processing circuit.

In recent years, a high frequency is used for signals reproduced by a magnetic disc apparatus in order to increase density and transfer speed of data. Thus, it is desirous to improve a high-frequency characteristic of a reproducing circuit which amplifies a signal generated by a magnetic head.

On the other hand, in the magnetic disc apparatus, the reproduction signal output from the magnetic head is supplied to a head IC through a transmission line such as a CAPS, a lead wire or a flexible pattern circuit (FPC), and the signal is amplified by the head IC. Such a transmission line has a capacitance and, thereby, the high-frequency characteristic of the reproduction signal is deteriorated and a cutoff frequency is decreased. Additionally, the high frequency characteristic of the reproduction signal is also deteriorated due to a frequency characteristic of the head IC.

Accordingly, it is desirous to improve the high frequency characteristic of the transmission line and the head IC so as to achieve an accurate transfer of the reproduction signal from the reproducing head to the head IC.

2. Description of the Related Art

FIG. 1 is a block diagram of a conventional magnetic disc apparatus. The conventional magnetic disc apparatus 100 shown in FIG. 1 records information on a magnetic disc 101 provided therein. The magnetic disc 101 is rotated by a spindle motor 102 in a direction indicated by arrow A. A magnetic head 103 is positioned above the magnetic disc 101 so as to record information on the magnetic disc 101 and read the information from the magnetic disc 101. The magnetic head 103 is supported on an end of an arm 104. The magnetic head 103 performs a recording operation or a reproducing operation while the magnetic head 103 is floated above the magnetic disc 101 due to a rotation of the magnetic disc 101.

The arm 104 is rotatably supported by a rotational shaft 105. An end of the arm 104 opposite to the end on which the magnetic head 103 is mounted is formed as a part of a voice coil motor 106. Thereby, the arm 104 can be rotated in directions indicated by arrows B about the rotational shaft 105 so that the magnetic head 103 is moved substantially in a radial direction of the magnetic disc 101.

The magnetic head 103 is connected to a head integrated circuit (head IC) 108 via a connection line 107. The connection line 107 comprises a lead wire and a flexible printed circuit (FPC). The head IC 108 is formed on the flexible printed circuit which can flexibly follow rotation of the arm 104 in the directions indicated by the arrows B. The head IC 108 amplifies a write current supplied to the magnetic head 103 so as to record information on the magnetic disc 101. The head IC 108 also amplifies a read current which is generated by the magnetic head 103 due to changes in a magnetic flux density provided by the magnetic disc 101.

FIG. 2A is a plan view of an arm structure including the arm 104; FIG. 2B is a side view of the arm structure shown in FIG. 2A. The arm structure comprises a plurality of arms 104 so as to support a plurality of magnetic heads 103. Hereinafter, a description will be given of one of the arms 104. The connection line comprises a lead wire 107a and an FPC 107b. The magnetic head 103 is connected to an end of the FPC 107b via the lead wire 107a. The FPC 107b is provided with wire patterns, and the head IC 108 is connected to the wire patterns. Thus, the magnetic head 103 is connected to the head IC 108 via the lead wire 107a and the wire patterns of the FPC 107b.

FIG. 3A is a plan view of the FPC 107b; FIG. 3B is a plan view of an end of the FPC 107 which is located on the side of the magnetic head 103; FIG. 3C is a plan view of an end of the FPC 107b which is connected to a circuit board.

The FPC 107b comprises a flexible board 201 on which a printed wire pattern 200 is formed. The flexible board 201 has a connection end 203 and a connection end 207 which are opposite ends of the flexible board 201. The printed wire pattern 200 is formed on the flexible board 201 between the connection ends 203 and 207. The printed wire pattern 200 comprises a wire pattern 202 on the side of the connection end 203 and a wire pattern 206 on the side of the connection end 207. A head IC mounting portion 205 is formed between the wire pattern 202 and the wire pattern 206.

An end of the lead wire 107a is connected by solder to a terminal 204 formed on the connection end 203 of the FPC 107b. The opposite end of the lead wire 107a is connected to the magnetic head 103. The head IC 108 is soldered to the head IC mounting portion 205. Accordingly, a reproduction signal transmitted to the wire pattern 202 is supplied to the head IC 108. The head IC 108 amplifies the reproduction signal and outputs the amplified signal to the wire pattern 206. Accordingly, the amplified signal is transmitted to the connection end 207.

The connection end 207 of the FPC 107b is connected to a circuit board (not shown in the figure). A pull-up circuit 109 and a read channel circuit (RDC) 110 are formed on the circuit board. The pull-up circuit 109 pulls up the output of the head IC 108 and supplies the output to the RDC 110.

FIG. 4 is a circuit diagram of the pull-up circuit 109. The pull-up circuit 109 comprises pull-up resistors R1 and R2 and AC coupling capacitors C1 and C2. An end of each of the pull-up resistors R1 and R2 is connected to a power source line Vcc, and the other end of each of the pull-up resistors R1 and R2 is connected to the head IC 108 so as to pull up an output signal. An end of the AC coupling capacitor C1 is connected to the end of the pull-up resistor R1 which is connected to the head IC 108. The other end of the AC coupling capacitor C1 is connected to the RDC 110. An end of the AC coupling capacitor C2 is connected to the end of the pull-up resistor R2 which is connected to the head IC 108. The other end of the AC coupling capacitor C2 is connected to the RDC 110. Each of the AC coupling capacitors C1 and C2 eliminates a DC component of the output of the head IC which is pulled up by the respective pull-up resistors R1 and R2, and supplies the output to the RDC 110.

The RDC 110 demodulates the signal supplied from the head IC 108 via the pull-up circuit 109. The signal demodulated by the RDC 110 is supplied to a microprocessor unit (MPU) 111 (refer to FIG. 1). The MPU 111 is connected to the RDC 110, a digital signal processor (DSP) 112 and a hard disc drive connector (HDC) 113. The MPU 111 processes information recorded on or reproduced from the magnetic disc 101. The MPU 111 also controls a rotation of the magnetic disc 101 and positioning of the magnetic head 103 in accordance with the information read from the magnetic disc 101 by the magnetic head 103.

The DSP 112 generates digital data for controlling rotation of the spindle motor 102 in accordance with digital data supplied by the MPU 111 which determines rotational speed of the magnetic disc 101. Additionally, the DSP 112 generates digital data for controlling operation of the voice coil motor 106 in accordance with digital data supplied by the MPU 111 which determines a position of the magnetic head 103. The digital data for controlling the rotational speed of the spindle motor 102 and the digital data for controlling the operation of the voice coil motor 106 are supplied to a digital analog converter (DAC) 114. The DAC 114 converts the digital data for controlling the spindle motor 102 into an analog signal, and supplies the analog signal to a spindle motor (SPM) drive circuit 115. The SPM drive circuit 115 generates a drive signal for driving the spindle motor 102, and supplies it to the spindle motor 102. Thus, the spindle motor 102 is rotated by the drive signal so that the magnetic disc 101 rotates in the direction indicated by the arrow A. The DAC 114 also converts the digital data for controlling the voice coil motor 106 into an analog signal, and supplies the analog signal to a voice coil motor (VCM) drive circuit 116. The VCM drive circuit 116 generates a drive signal for driving the voice coil motor 106, and supplies it to the voice coil motor 106. Thus, the voice coil motor 106 is operated by the drive signal so that the arm 104 is moved in the directions indicated by the arrows B so as to locate the magnetic head 103 at a designated position.

The HDC 113 is connected between the MPU 111 and a connector 117 which is connected to an external device. The HDC 113 controls data transmission between the magnetic disc apparatus 100 and the external device such as a host computer 120.

In the above-mentioned conventional magnetic disc apparatus, the reproduction signal is supplied from the magnetic head 103 to the head IC 108 via the lead wire 107a and the FPC 107b. Thus, the connection line between the magnetic head 103 and the head IC 108 is relatively long. Each of the lead wire 107a and the FPC 107b has a capacitance which may decrease a cutoff frequency for the reproduction signal. That is, the capacitance of the lead wire 107a and the FPC 107b deteriorates the high-frequency characteristic of the signal transmission line. Additionally, the head IC 108 itself has a frequency characteristic which may deteriorate the high-frequency characteristic of the signal transmission line.

FIG. 5 is a graph representing a frequency characteristic of a signal supplied to the read channel circuit (RDC) of the conventional magnetic disc apparatus. The high-frequency characteristic in a high-frequency range is shifted in a direction indicated by an arrow C as shown in FIG. 5 due to the capacitance of the lead wire and FPC and the frequency characteristic of the head IC. That is, the high-frequency component of the reproduction signal is deteriorated due to the characteristic of the connection line between the magnetic head and the read channel circuit provided in the circuit board.

SUMMARY OF THE INVENTION

It is a general object of the present invention to provide an improved and useful information recording and reproducing apparatus having a reproducing circuit in which the above-mentioned problem is eliminated.

A more specific object of the present invention is to provide a magnetic recording and reproducing apparatus having a reproducing circuit which improves a high-frequency characteristic of a reproduction signal output from a read head.

In order to achieve the above-mentioned objects, there is provided according to one aspect of the present invention an information reproducing apparatus for reproducing information recorded on a recording medium by reading the information by a read head, comprising:

a first amplifying circuit for amplifying a reproduction signal generated by the read head;

a second amplifying circuit comprising a high-frequency amplifying circuit for amplifying the reproduction signal amplified by the first amplifying circuit in a high-frequency amplifying manner;

a third amplifying circuit for amplifying the reproduction signal amplified by the second amplifying circuit; and a reproducing circuit for reproducing the reproduction signal amplified by the third amplifying circuit.

According to the above-mentioned invention, since a cascode amplifier can be constituted by a combination of the first amplifying circuit and the second amplified circuit, the high-frequency characteristic of the reproduction signal output from the read head is improved. The reproduction signal generated by the read head is further amplified by the third amplifying circuit and is supplied to the reproducing circuit. Thus, the reproduction signal supplied to the reproducing circuit is superior in the high-frequency characteristic. Accordingly, even when high density data is recorded on the recording medium, the reproducing circuit can accurately reproduce the original data recorded on the recording medium.

Additionally, there is provided according to another aspect of the present invention an information recording and reproducing apparatus having a recording medium on which information is recorded, comprising:

a read head reading the information on the recording medium;

a flexible printed-circuit board transmitting a reproduction signal generated by the read head;

a first amplifying circuit provided on the flexible printed-circuit board for amplifying the reproduction signal;

a circuit board having a reproducing circuit for demodulating the reproduction signal amplified by the first amplifying circuit, the flexible printed-circuit board connected to the circuit board;

a second amplifying circuit comprising a high frequency amplifying circuit for amplifying the reproduction signal amplified by the first amplifying circuit in a high-frequency amplifying manner; and a third amplifying circuit for amplifying the reproduction signal amplified by the second amplifying circuit, the reproduction signal amplified by the third amplifying circuit being provided to the reproducing circuit.

According to the above-mentioned invention, since a cascode amplifier can be constituted by a combination of the first amplifying circuit and the second amplifying circuit, the high-frequency characteristic of the reproduction signal output from the read head is improved. The reproduction signal generated by the read head is further amplified by the third amplifying circuit and is supplied to the reproducing circuit. Thus, the reproduction signal supplied to the reproducing circuit is superior in the high-frequency characteristic. Accordingly, even when high density data is recorded on the recording medium, the reproducing circuit can accurately reproduce the original data recorded on the recording medium.

In the present invention, the first amplifying circuit may include an emitter grounded amplifying circuit as an output stage circuit and the second amplifying circuit comprises a base grounded amplifying circuit so that a cascode amplifier is constituted by a combination of the emitter grounded amplifying circuit and the base grounded amplifying circuit.

Additionally, the second amplifying circuit and the third amplifying circuit may be located adjacent to the reproducing circuit so that deterioration of the reproduction signal occurring in a transmission line between the second amplifying circuit and the third amplifying circuit is minimized.

In one embodiment according to the present invention, the base grounded amplifying circuit may comprise:

- a damping resistor having a first terminal connected to the first amplifying circuit and a second terminal opposite to the first terminal;
- a load resistor having a first terminal provided with a power source voltage and a second terminal opposite to the first terminal;
- a bias voltage generating circuit generating a bias voltage; and
- a transistor having an emitter, a collector and a base, the emitter connected to the second terminal of the damping resistor, the collector connected to the second terminal of the load resistor, the base being provided with the bias voltage generated by the bias voltage generating circuit,
- wherein an output signal of the second amplifying circuit is obtained at a junction between the load resistor and the collector of the transistor.

Since the base grounded amplifying circuit has a superiority in a high-frequency characteristic, the second amplifying circuit can improve the high frequency characteristic of an output of the first amplifying circuit.

A resistance of the damping resistor may be determined so as to correct a high-frequency characteristic of the output signal of the second amplifying circuit so that the reproduction signal supplied to the reproducing circuit has an optimum high-frequency characteristic.

The third amplifying circuit may comprise a collector grounded amplifying circuit so that the third amplifying circuit which is connected to the reproducing circuit has an optimum impedance.

In one embodiment of the present invention, the collector grounded amplifying circuit may comprise:

- a transistor having an emitter, a collector and a base, a power source voltage being provided to the collector, an output signal of the second amplifying circuit being provided to the base; and
- a load resistor having a first terminal and a second terminal opposite to the first terminal, the first terminal connected to the emitter of the transistor, the second terminal being provided with a common reference voltage.

In this construction, the load resistor provides an optimum impedance. Thus, when a measuring instrument is connected for measuring a reproduction signal waveform, the measurement can be performed without an influence of the measuring instrument.

Additionally, a filter circuit may be provided so as to stabilize the power source voltage.

The first, second and third amplifying circuits may be provided for each polarity of the signal generated by the read head.

Further, the second amplifying circuit and the third amplifying circuit may be formed on the circuit board. In another case, the second amplifying circuit and the third amplifying circuit may be formed on the flexible printed-circuit board. Alternatively, the second amplifying circuit and the third amplifying circuit may be formed together with the reproducing circuit in a single semiconductor device.

Other objects, features and advantages of the present invention will become more apparent from the following detailed description when read in conjunction with the accompanying drawings.

BRIEF DESCRIPTION OF THE DRAWINGS

FIG. 8A is a plan view of a suspension arm shown in FIG. 7;

FIG. 8B is a side view of the suspension arm shown in FIG. 8A;

FIG. 9 is a side view of a part of the arm actuator shown in FIG. 7;

DETAILED DESCRIPTION OF THE PREFERRED EMBODIMENT

Figure 6:
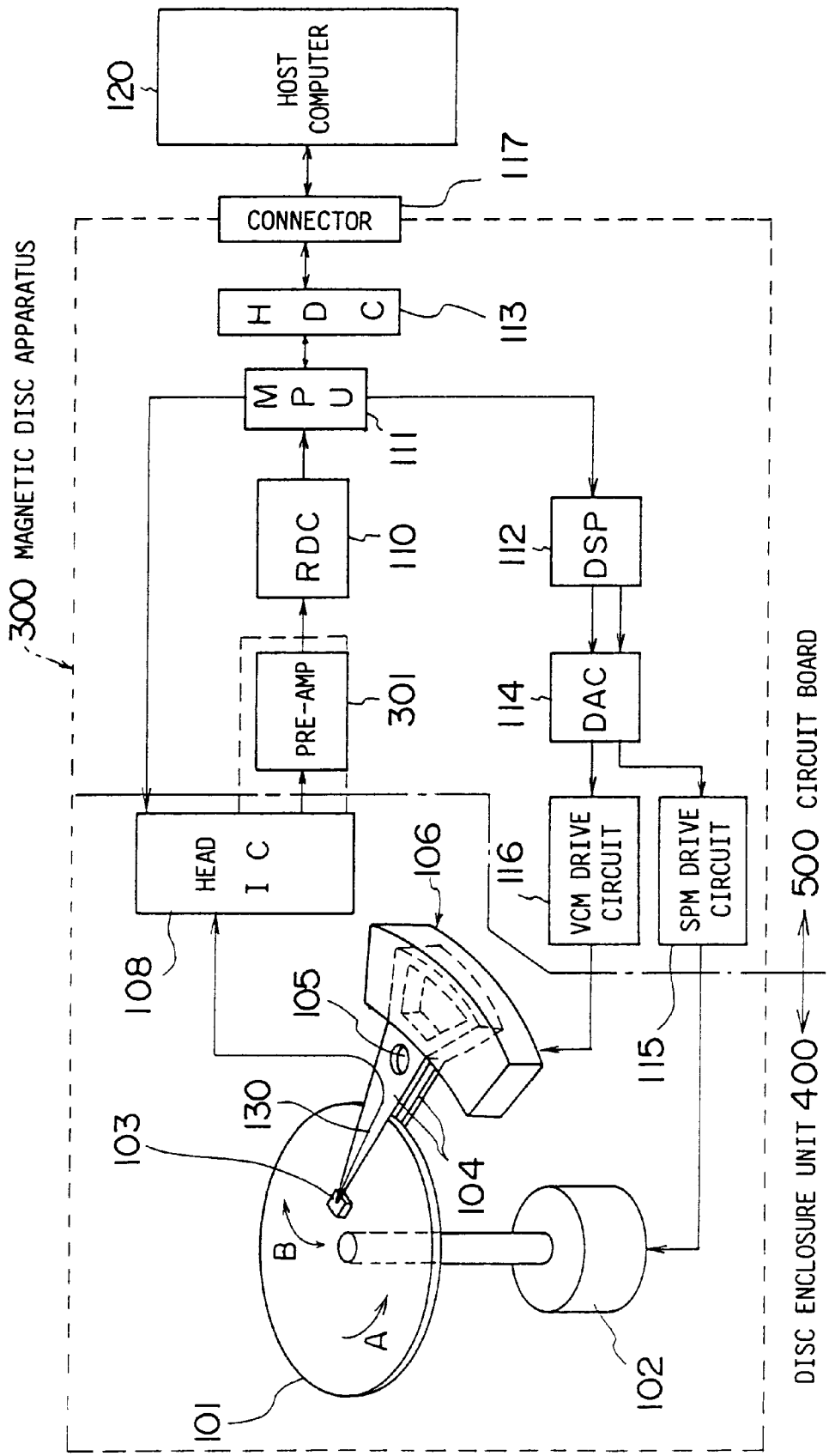
FIG. 6 is a block diagram of a magnetic disc apparatus according to a first embodiment of the present invention.

A description will now be given of a first embodiment of the present invention. FIG. 6 is a block diagram of a magnetic disc apparatus according to the first embodiment of the present invention. In FIG. 6, parts that are the same as the parts shown in FIG. 1 are given the same reference numerals, and descriptions thereof will be omitted.

Figure 1:
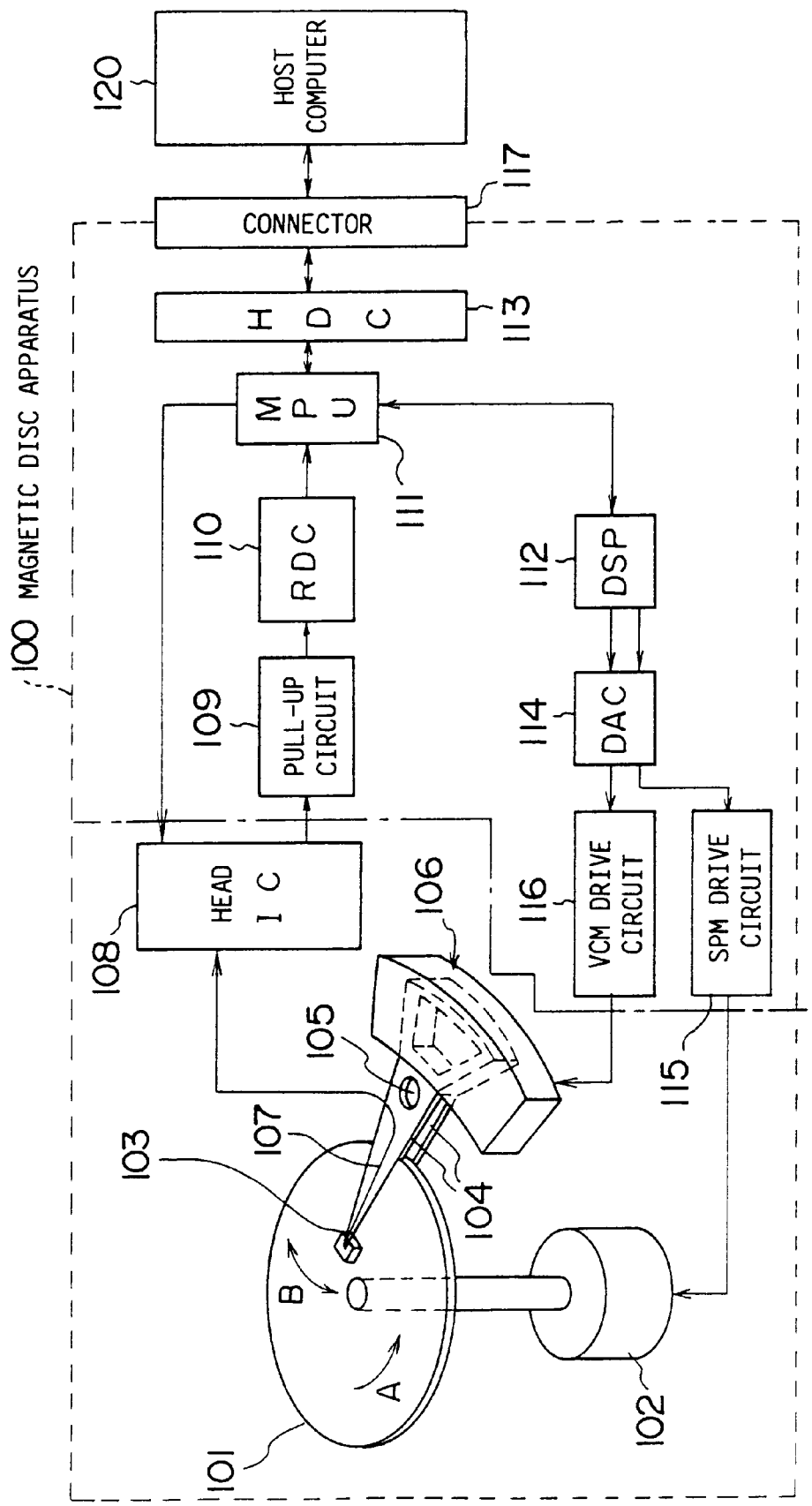
FIG. 1 is a block diagram of a conventional magnetic disc apparatus.
Figure 2A:
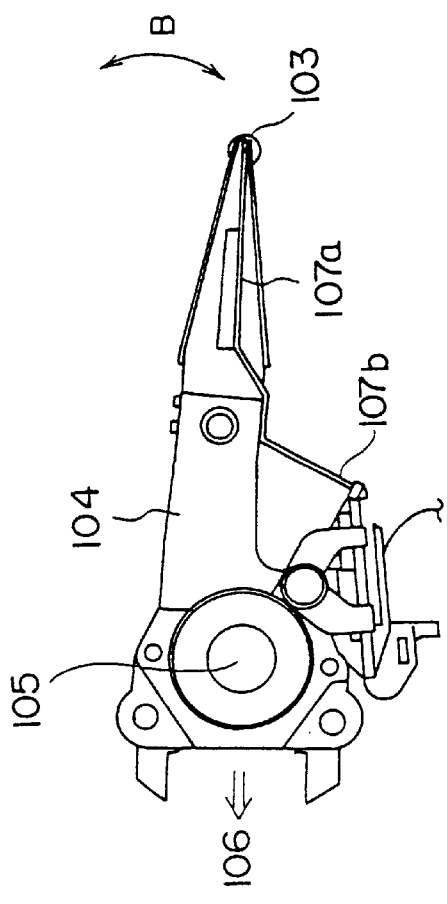
FIG. 2A is a plan view of an arm structure provided in the conventional magnetic apparatus.
Figure 2B:
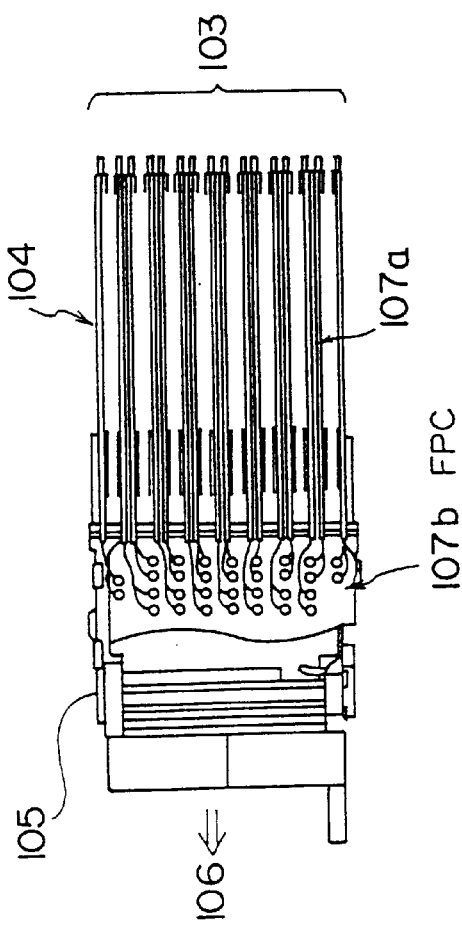
FIG. 2B is a side view of the arm structure shown in FIG. 2A.

The magnetic disc apparatus 300 according to the present embodiment has a structure the same as that of the magnetic disc apparatus 100 shown in FIG. 1 except for the pull-up circuit 109 being replaced with a pre-amplifier 301. That is, in the present embodiment, the head IC 108 is connected to the MPU 111 via the pre-amplifier 301 and the RDC 110. The pre-amplifier 301 is constructed as a circuit which improves the deterioration of the high-frequency characteristic of the reproduction signal due to a capacitance of a signal transmission line from the magnetic head 103 to the head IC 108 and from the head IC 108 to the pre-amplifier 301 and also a frequency characteristic of the circuit.

The pre-amplifier 301 is provided between the head IC 108 and the RDC 110. The pre-amplifier improves the high-frequency characteristic of the signal from the head IC 108, and pulls up the signal to be supplied to the RDC 110 similar to the conventional pull-up circuit 109. The pre-amplifier 301 is provided on a circuit board 500 on which the RDC 110 is provided. The pre-amplifier 301 is positioned immediately before an input terminal of the RDC 110.

Figure 7:
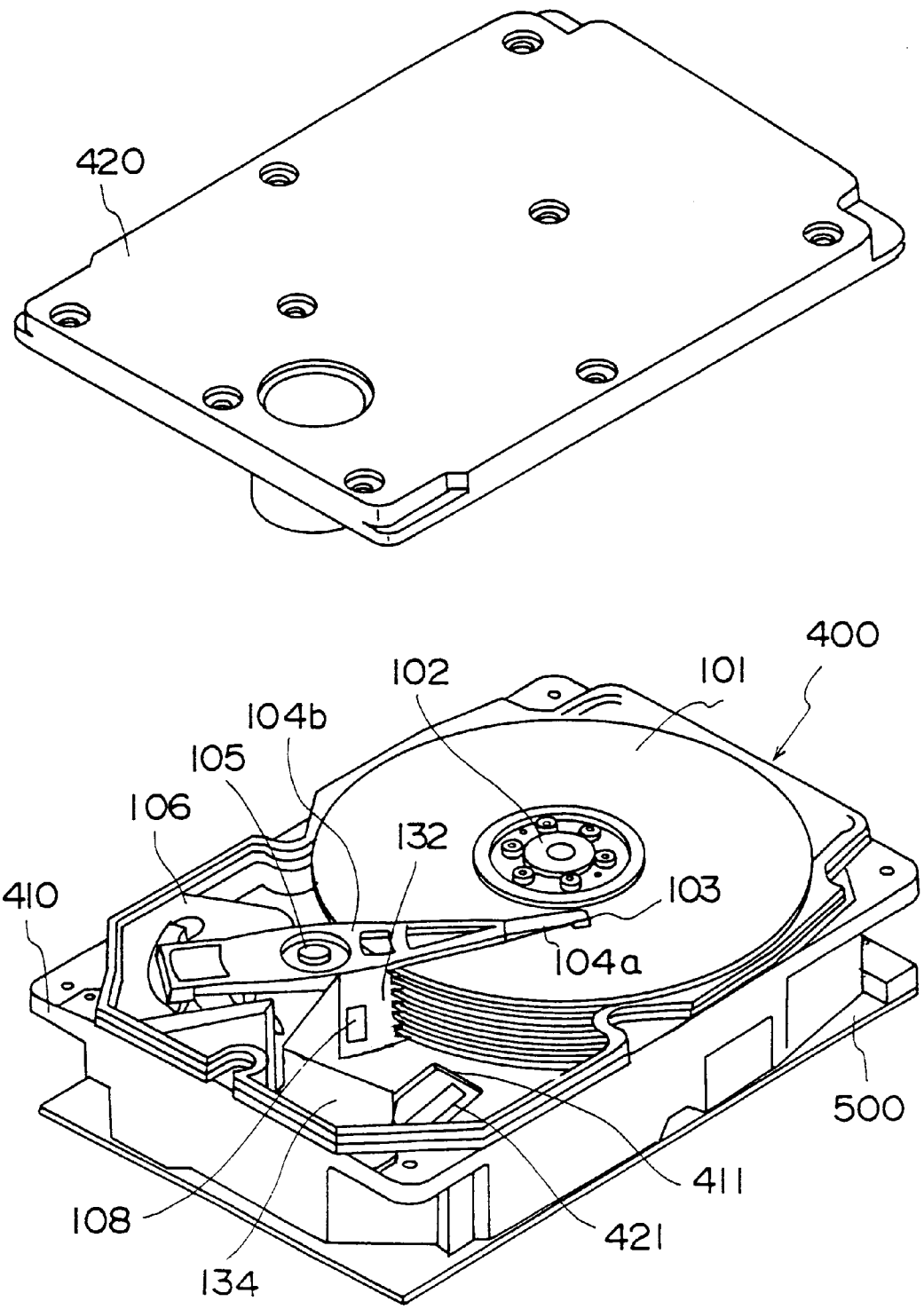
FIG. 7 is a perspective view of the magnetic disc apparatus according to the first embodiment of the present invention.

FIG. 7 is a perspective view of the magnetic disc apparatus 300 according to the present embodiment. The magnetic disc apparatus 300 comprises a disc enclosure unit 400 and the circuit board 500.

The disc enclosure unit 400 comprises a base 410 and a cover 420. The magnetic disc 101 which is mounted on a rotational shaft of the spindle motor 102 is accommodated in the base 410. An actuator unit which includes the arms 104, the rotational shaft 105 and the VCM 106 is also accommodated in the base 410. The cover 420 closes an opening of the base 410 so as to sealingly enclose the parts accommodated in the base 410.

The magnetic head 103 is mounted on an extreme end of each of the arms 104, and is electrically connected to the circuit board 500 via a connection line 130. Each of the arms 104 comprises suspension arm 104a and an actuator arm 104b. The magnetic head 103 is mounted on an end of the suspension arm 104a, and the opposite end of the suspension arm 104a is fixed to the actuator arm 104b. The magnetic head 103 is movably supported due to elastic deformation of the suspension arm 104a.

The connection line 130 includes a flexible pattern circuit (FPC) 134, a conductive pattern formed on the suspension arm 104 and a connecting FPC 132 which connects the conductive pattern to the FPC 134.

FIG. 8A is a plan view of the suspension arm 104a; FIG. 8B is a side view of the suspension arm 104a. As shown in FIG. 8A, a conductive pattern 131a is formed on a surface of the suspension arm 104a. The conductive pattern 131a is a part of the connection line which electrically connects the magnetic head 103 to the circuit board 500. The conductive pattern 131a is formed on a thin film of resin applied on the surface of the suspension arm 104a. The conductive pattern formed on the thin film of resin is covered by a thin film of resin. One end of the conductive pattern 131a is connected to the magnetic head 103, and the opposite end of the conductive pattern 131a is connected to the connecting FPC 132. A side protruding portion 104c is formed on a side of the suspension arm 104a near the end which is fixed to the actuator arm 104b so as to connect the conductive pattern 131a to the connecting FPC 132. The conductive pattern 131a is exposed at the side protruding portion 104c, and soldered to the connecting FPC 132.

Figure 3A:
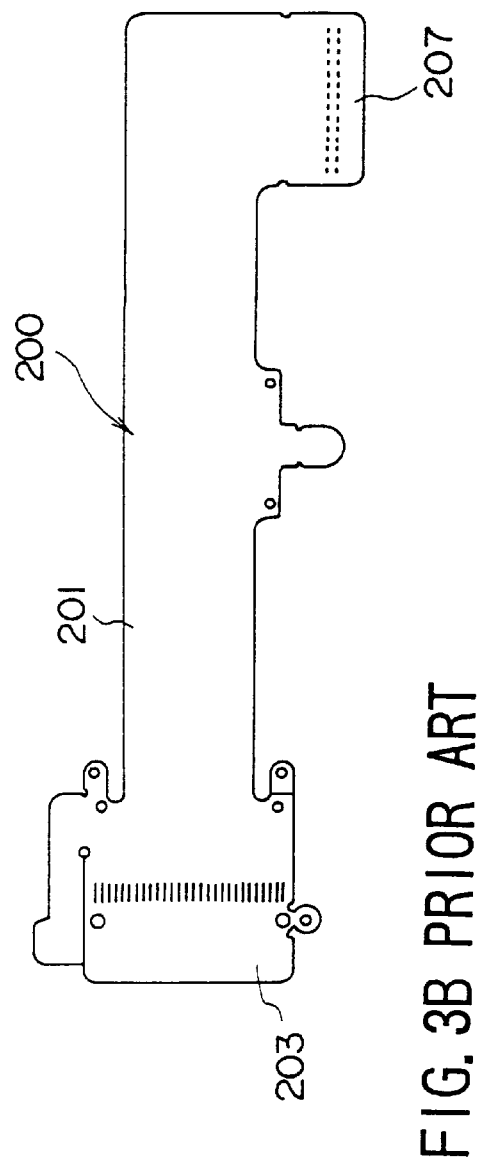
FIG. 3A is a plan view of a flexible pattern circuit.
Figure 3C:
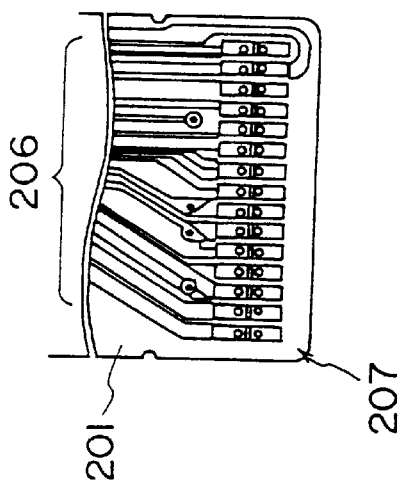
FIG. 3C is a plan view of an end of the flexible pattern circuit which is connected to a circuit board.
Figure 3B:
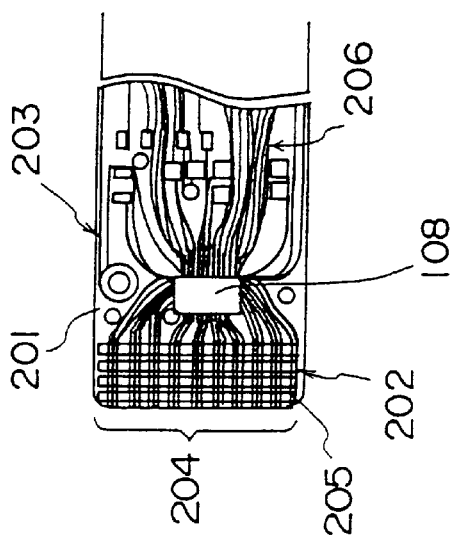
FIG. 3B is a plan view of an end of the flexible pattern circuit shown in FIG. 3A which is located on the side of a magnetic head.
Figure 4:
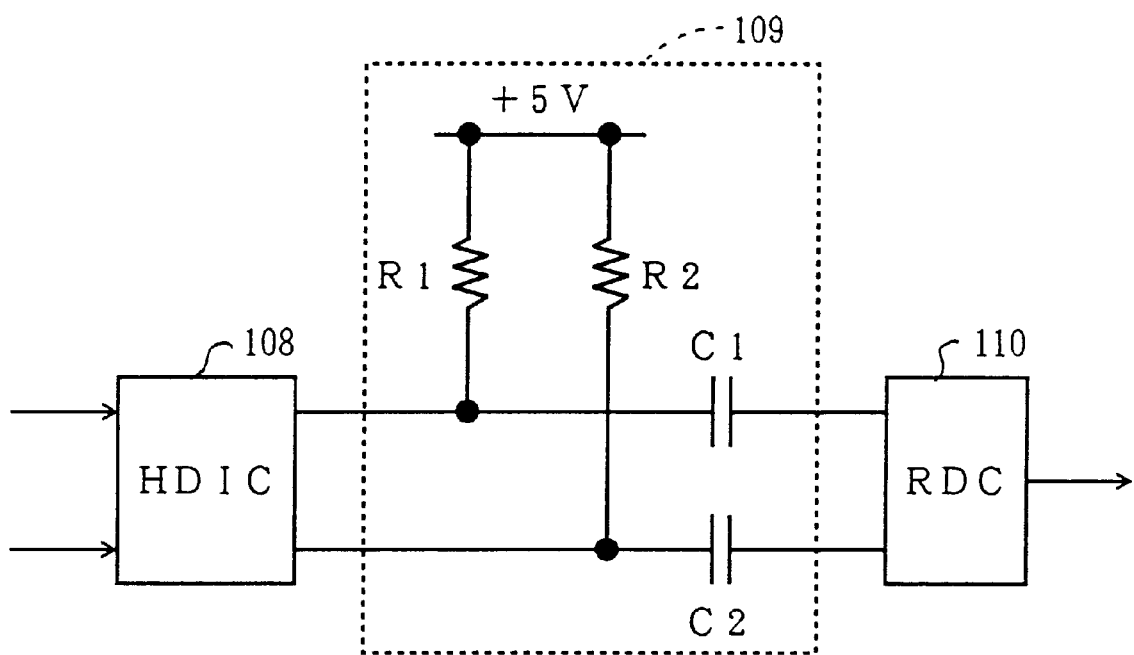
FIG. 4 is a circuit diagram of a pull-up circuit provided in the conventional magnetic disc apparatus.
Figure 5:
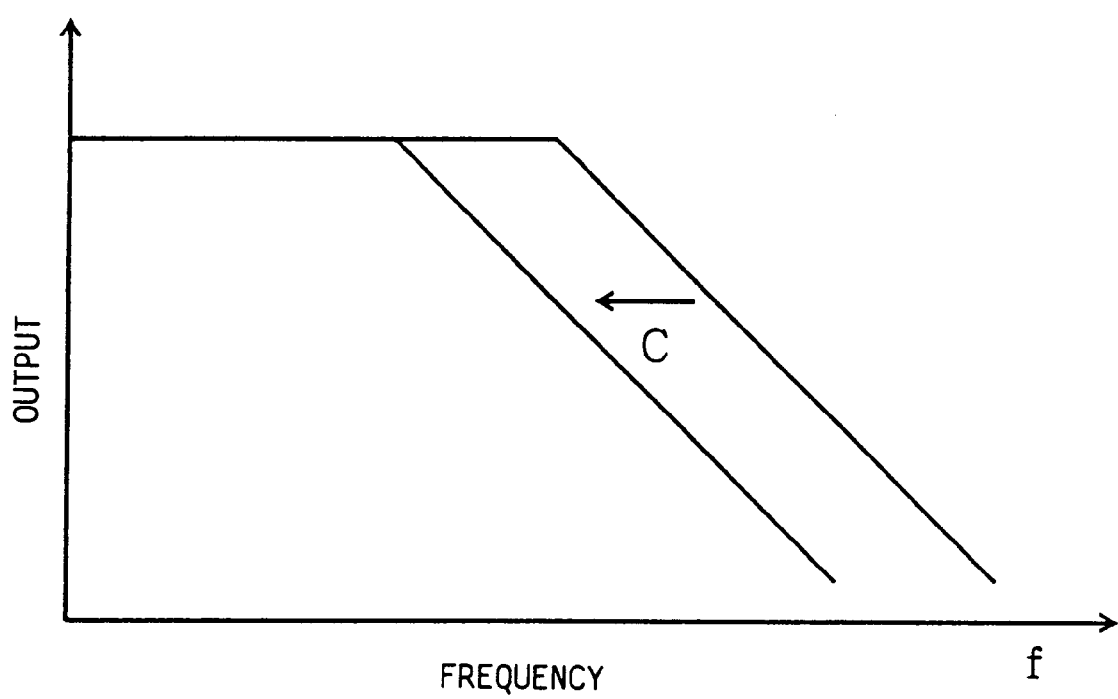
FIG. 5 is a graph representing a frequency characteristic of a signal supplied to a read channel circuit of the conventional magnetic disc apparatus.

FIG. 9 is a side view of a part of the actuator arm 104b. The connecting FPC 132 is arranged parallel to a side of the actuator arm 104b. One end of the connecting FPC 132 is connected to the conductive pattern 131a, and opposite end of the connecting arm 132 is soldered to the FPC 134. The FPC 134 has substantially the same construction as the FPC 107b shown in FIG. 3A, and a description thereof will be omitted.

The circuit board 500 is formed by a printed-circuit board on which various chips such as integrated circuits and resistor elements are mounted. The circuit board 500 has a shape substantially the same as the shape of the base 410, and is fixed to a bottom side of the base 410. A bottom plate of the base 410 is provided with an opening 411 which receives a connector 421 mounted on the circuit board 500. A connection end (corresponding to the connection end 207 of the FPC 107b) of the FPC 134 is connected to the connector 421 and, thereby, the FPC 134 is electrically connected to the circuit board 500.

As mentioned above, the reproduction signal generated by the magnetic head 103 is transmitted, via the conductive pattern 131a and the connecting FPC 132, to the FPC 134 on which the head IC 108 is mounted. Thus, the reproduction signal is transmitted to the circuit board 500 via the FPC 134 and the connector 421.

Additionally, in the present embodiment, the pre-amplifier 301 is mounted on the circuit board 500 so as to correct the deterioration of the frequency characteristic of the reproduction signal due to the conductive pattern 131a, the connecting FPC 132, the FPC 134 and the head IC 108. The reproduction signal is corrected immediately before the signal is supplied to the RDC 110.

Figure 10:
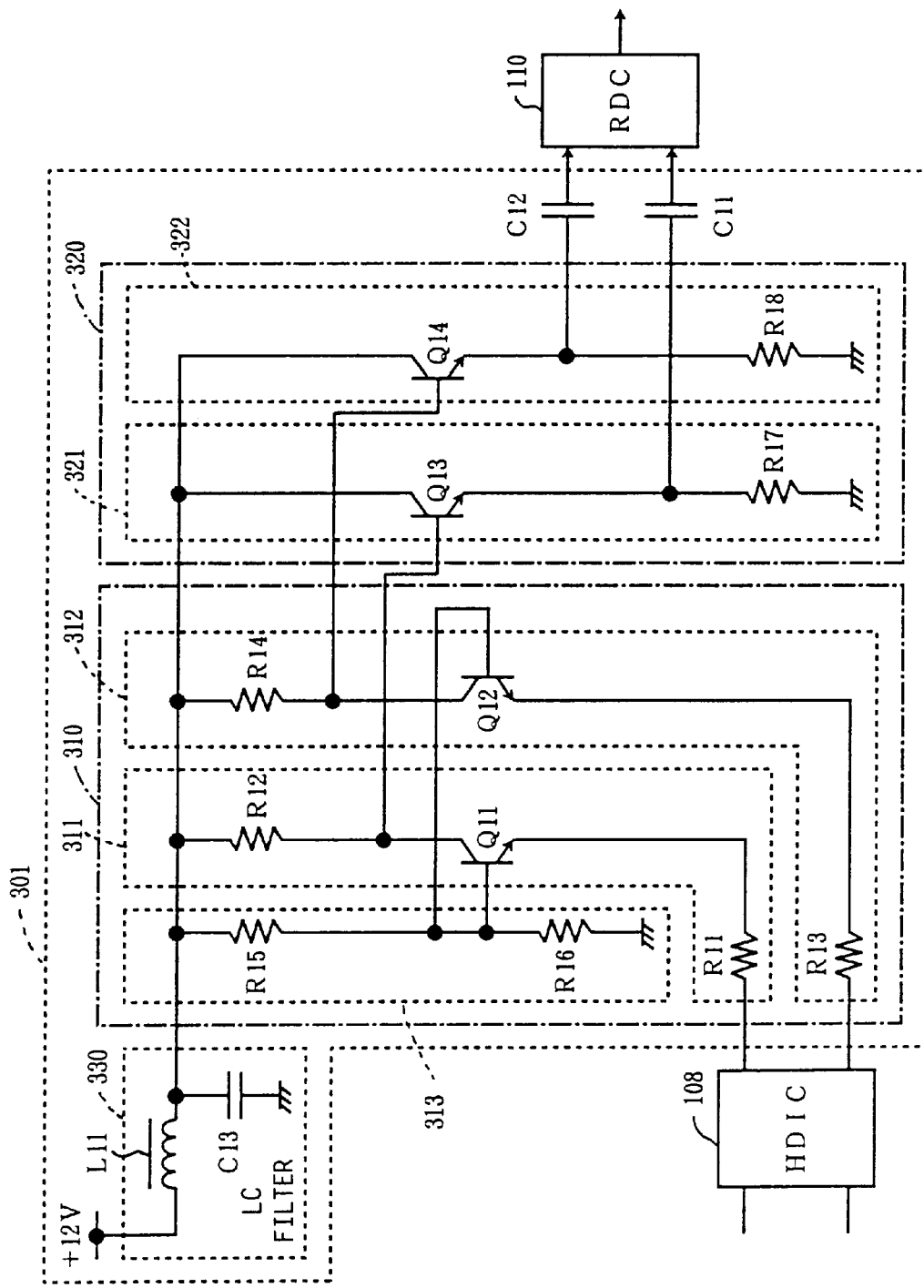
FIG. 10 is a circuit diagram of a pre-amplifier shown in FIG. 6.

FIG. 10 is a circuit diagram of the preamplifier 301. As shown in FIG. 10, the pre-amplifier 301 comprises a base grounded amplifying circuit 310, a collector grounded amplifying circuit (emitter follower) 320, a filter circuit 330 and capacitors C11 and C12.

The base grounded amplifying circuit 310 is provided for amplifying an output signal of the head IC 108. The collector grounded amplifying circuit 320 amplifies an output signal of the base grounded amplifying circuit 310. The filter circuit 330 smoothes a power source voltage Vcc. The capacitors C11 and C12 cut off a direct current component of a signal output from the pre-amplifier 301.

The base grounded amplifying circuit 310 comprises a first base grounded amplifying circuit section 311 which amplifies one of polarized signals output from the magnetic head 103, a second base grounded amplifying circuit section 312 which amplifies the other one of the polarized signals output from the magnetic head 103 and a bias circuit 313 which provides a bias voltage to each of the amplifying circuit sections 311 and 312.

The first base grounded amplifying circuit section 311 comprises an NPN transistor Q11 and resistors R11 and R12. A base of the transistor Q11 is connected to the bias circuit 313 so that the base is biased by a constant bias voltage. An emitter of the transistor Q11 is connected to the head IC 108 via the resistor R11 so as to pull in a current corresponding to the output signal of the head IC 108. A collector of the transistor Q11 is connected to a power source voltage line via the resistor R12 and the filter circuit 330. The filter circuit 330 smoothes the power source voltage so as to eliminate noise components from the power source voltage Vcc. An output stage of the head IC 108 is constructed as an open collector circuit, that is, an emitter grounded amplifying circuit so that a cascode amplifier is formed by a combination of the first base grounded amplifying circuit section 311 and the output stage of the head IC 108. Accordingly, a circuit can be achieved which has the same superiority as that of a base grounded amplifying circuit while a gain substantially the same as that of an emitter grounded amplified circuit is provided.

The second base grounded amplifying circuit section 312 comprises an NPN transistor Q12 and resistors R13 and R14. A base of the transistor Q12 is connected to the bias circuit 313 so that the base is biased by a constant bias voltage. An emitter of the transistor Q12 is connected to the head IC 108 via the resistor R13 so as to pull in a current corresponding to the output signal of the head IC 108. A collector of the transistor Q12 is connected to the power source voltage line via the resistor R14 and the filter circuit 330. The filter circuit 330 smoothes the power source voltage so as to eliminate noise components from the power source voltage Vcc. An output stage of the head IC 108 is constructed as an open collector circuit, that is, an emitter grounded amplifying circuit, so that a cascode amplifier is formed by a combination of the second base grounded amplifying circuit section 312 and the output stage of the head IC 108. Accordingly, a circuit can be achieved which has the same superiority as that of a base grounded amplifying circuit while a gain substantially the same as that of an emitter grounded amplified circuit is provided.

The bias circuit 313 comprises resistors R15 and R16. The bias circuit 313 divides, by the resistors R15 and R16, the power source voltage Vcc' which has been smoothed by the filter circuit 330 so as to eliminate noise components. The constant bias voltage is output from a junction between the resistor R15 and the resistor R16.

The collector grounded amplifying circuit 320 comprises a first collector grounded amplifying circuit section 321 which amplifies an output signal of the first base grounded amplifying circuit section 311 and a second collector amplifying circuit section 322 which amplifies an output signal of the second base grounded amplifying circuit section 312.

The first collector grounded amplifying circuit section 321 comprises an NPN transistor Q13 and a load resistor R17. A base of the transistor Q13 serves as an input terminal of the first collector grounded amplifying circuit 321, and is connected to a junction between the load resistor R12 and the transistor Q11, which junction serves as an output terminal of the first base grounded amplifying circuit section 311. A collector of the transistor Q13 is connected to the power source voltage line via the filter circuit 330. The filter circuit 330 smoothes the power source voltage Vcc so as to eliminate noise components from the power source voltage Vcc. An emitter of the transistor Q13 is grounded via the load resistor R17. A junction between the emitter of the transistor Q13 and the load resistor R17 serves as an output terminal of the first collector grounded amplifying circuit section 321, and is connected to the RDC 110 via the capacitor C11.

The second collector grounded amplifying circuit section 322 comprises an NPN transistor Q14 and a load resistor R18. A base of the transistor Q14 serves as an input terminal of the second collector grounded amplifying circuit 322, and is connected to a junction between the load resistor R14 and the transistor Q12 which junction serves as an output terminal of the second base grounded amplifying circuit section 312. A collector of the transistor Q14 is connected to the power source voltage line via the filter circuit 330. The filter circuit 330 smoothes the power source voltage Vcc so as to eliminate noise components from the power source voltage Vcc. An emitter of the transistor Q13 is grounded via the load resistor R18. A junction between the emitter of the transistor Q14 and the load resistor R18 serves as an output terminal of the second collector grounded amplifying circuit section 322, and is connected to the RDC 110 via the capacitor C12.

The filter circuit 330 comprises a coil L11 and a capacitor C13. The power source voltage Vcc (+12 V) is provided to one end of the coil L11. The opposite end of the coil L11 is grounded via the capacitor C13. The coil L11 and the capacitor C13 together constitute an LC filter. The power source voltage Vcc' which does not have noise components is output from a junction between the coil L11 and the capacitor C13.

The junction between the coil L11 and the capacitor C13 is connected to the resistor R12 of the first base grounded amplifying circuit section 311, the resistor R14 of the second base grounded amplifying circuit section 312, the resistor R15 of the bias circuit 313, the collector of the transistor Q13 of the first collector grounded amplifying circuit section 321 and the collector of the transistor Q14 of the second collector grounded amplifying circuit section 322. Accordingly, the constant power source voltage Vcc' which is stabilized by the filter circuit 330 is supplied to the first base grounded amplifying circuit section 311, the second base grounded amplifying circuit section 312, the bias circuit 313, the first collector grounded amplifying circuit section 321 and the second collector grounded amplifying circuit section 322. Thus, the pre-amplifier 301 can perform a stable operation.

Figure 11:
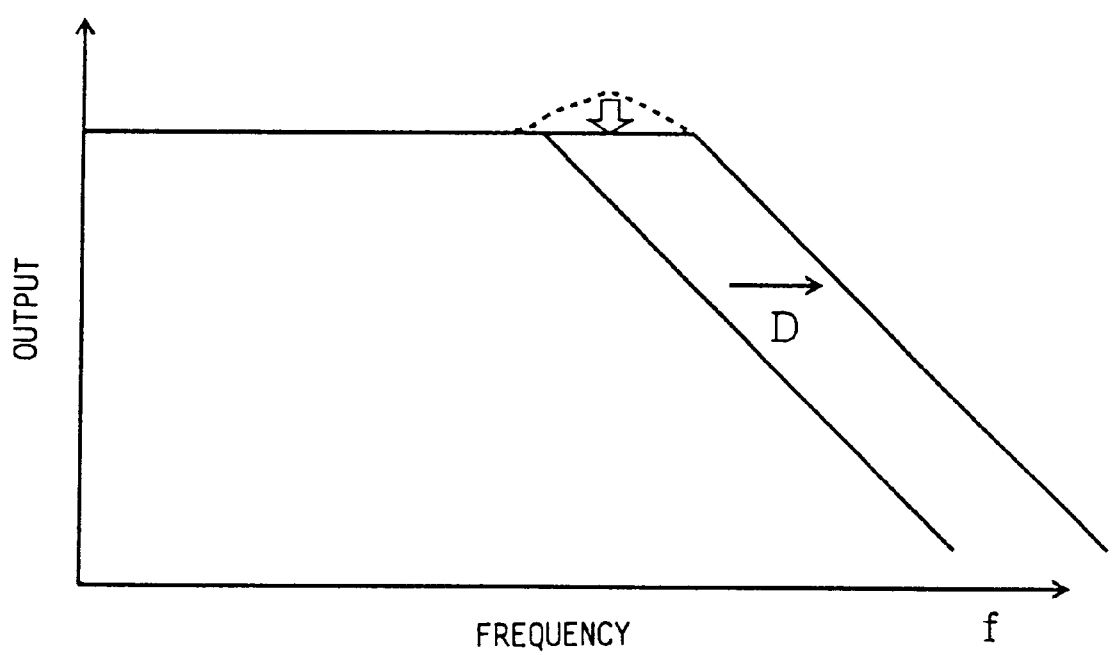
FIG. 11 is a graph representing a frequency characteristic of a signal supplied to a read channel circuit of the magnetic disc apparatus according to the first embodiment of the present invention.

FIG. 11 is a graph representing a frequency characteristic of a signal supplied to the read channel circuit 110 shown in FIG. 6. According to the present embodiment, the cascode amplifier is constituted by the base grounded amplifying circuit 310 of the RDC 110 and the emitter grounded amplifying circuit of the output stage of the head IC 108. Thus, when the high-frequency characteristic of the reproduction signal is deteriorated while the reproduction signal is transmitted from the magnetic head 103 to the RDC 110 via the head IC 108, the high-frequency signal is compensated for by the cascode amplifier in a direction indicated by an arrow D in FIG. 11 immediately before the signal is supplied to the RDC 110.

When the compensation is performed by the cascode amplifier, the output level of the signal on the high-frequency side may be unnecessarily increased as indicated by a dotted line in FIG. 11. However, in the present embodiment, the increase in the output level on the high-frequency side is controlled by the load resistors R11 and R13 of the base grounded amplifying circuit 310 so that a substantially flat characteristic is achieved as indicated by a solid line in FIG. 11.

As mentioned above, in the present embodiment, the high-frequency characteristic of the reproduction signal can be improved by the cascode amplifier which is constituted by the combination of the emitter grounded amplifying circuit of the output stage of the conventional head IC 108 and the base grounded amplifying circuit 310 of the pre-amplifier 301. Thus, the high-frequency characteristic of the reproduction signal can be improved by a simple structure. That is, the reproduction signal can be accurately reproduced when a high-density and high-speed transmission is performed.

Additionally, deterioration of the signal due to the cascode amplifier can be reduced by the collector grounded amplifying circuit 320 provided subsequent to the base grounded amplifying circuit 310.

Further, the base grounded amplifying circuit 310 and the collector grounded amplifying circuit 320 can be driven without an influence of noise generated in the power source since the power source voltage Vcc is supplied to the base grounded amplifying circuit 310 and the collector grounded amplifying circuit 320 after the noise component is eliminated by the filter circuit 330.

It should be noted that although the pre-amplifier 301 is mounted on the circuit board 500 on which the RDC 110 is formed, the present invention is not limited to this structure and the pre-amplifier 301 may be mounted on the FPC 134. Alternatively, the pre-amplifier 301 may be integrally formed in a semiconductor chip which provides the head IC. That is, the pre-amplifier 301 may be located at any position between the head IC 108 and the RDC 110.

In the magnetic disc apparatus according to the above-mentioned embodiment, the reproduction signal generated by the magnetic head is transmitted through the conductive pattern and the connecting FPC. However, the present invention may be applied to a magnetic disc apparatus in which the reproduction signal is transmitted through a lead wire. Additionally, the present invention may be applied to other types of information recording and reproducing apparatuses such as an optical disc apparatus or a magneto-optical disc apparatus.

The present invention is not limited to the specifically disclosed embodiments, and variation and modifications may be made without departing from the scope of the present invention.

What is claimed is:

1. An information reproducing apparatus for reproducing information recorded on a recording medium by reading the information by a read head, comprising:
 a cascode amplifier including a first amplifying circuit for amplifying a reproduction signal generated by the read head, and a second amplifying circuit connected to said first amplifying circuit via a flexible circuit board;
 said second amplifying circuit comprising a high-frequency amplifying circuit for amplifying the reproduction signal amplified by said first amplifying circuit in a high-frequency amplifying manner; and
 a reproducing circuit for reproducing the reproduction signal amplified by said second amplifying circuit;
 wherein a cascode connection between the first and second amplifying circuits generally eliminates an influence of stray capacitance and impedance of a circuit pattern on said flexible circuit board.

2. The information reproducing apparatus as claimed in claim 1, wherein said first amplifying circuit includes an emitter grounded amplifying circuit as an output stage circuit and said second amplifying circuit comprises a base grounded amplifying circuit so that a cascode amplifier is constituted by a combination of said emitter grounded amplifying circuit and said base grounded amplifying circuit.

3. The information reproducing apparatus as claimed in claim 1, wherein said second amplifying circuit is located adjacent said reproducing circuit.

4. The information reproducing apparatus as claimed in claim 2, wherein said base grounded amplifying circuit comprises:
 a damping resistor having a first terminal connected to said first amplifying circuit and a second terminal opposite to said first terminal;
 a load resistor having a first terminal provided with a power source voltage and a second terminal opposite to said first terminal;
 a bias voltage generating circuit generating a bias voltage; and
 a transistor having an emitter, a collector and a base, said emitter connected to said second terminal of said damping resistor, said collector connected to said second terminal of said load resistor, said base being provided with the bias voltage generated by said bias voltage generating circuit, wherein an output signal of said second amplifying circuit is obtained at a junction between said load resistor and said collector of said transistor.

5. The information reproducing apparatus as claimed in claim 4, wherein a resistance of said damping resistor is determined so as to correct a high-frequency characteristic of the output signal of said second amplifying circuit.

6. The information reproducing apparatus as claimed in claim 1, further comprising a third amplifying circuit for amplifying the reproduction signal amplified by said second amplifying circuit, said third amplifying circuit including a collector grounded amplifying circuit.

7. The information reproducing apparatus as claimed in claim 6, wherein said collector grounded amplifying circuit comprises:
 a transistor having an emitter, a collector and a base, a power source voltage being provided to said collector, an output signal of said second amplifying circuit being provided to said base; and
 a load resistor having a first terminal and a second terminal opposite to said first terminal, said first terminal connected to said emitter of said transistor, said second terminal being provided with a common reference voltage.

8. The information reproducing apparatus as claimed in claim 4, further comprising a filter circuit stabilizing the power source voltage.

9. The information reproducing apparatus as claimed in claim 1, wherein said first, second and third amplifying circuits are provided for each polarity of the signal generated by said read head.

10. An information recording and reproducing apparatus having a recording medium on which information is recorded, comprising:
 a read head reading the information on said recording medium;
 a flexible printed-circuit board transmitting a reproduction signal generated by said read head;
 a first amplifying circuit provided on said flexible printed-circuit board for amplifying the reproduction signal;
 a circuit board having a reproducing circuit for demodulating the reproduction signal amplified by said first amplifying circuit, said flexible printed-circuit board being connected to said circuit board;
 a second amplifying circuit comprising a high frequency amplifying circuit for amplifying the reproduction signal amplified by said first amplifying circuit in a high-frequency amplifying manner, said second amplifying circuit being provided separately from said first amplifying circuit; and
 a third amplifying circuit for amplifying the reproduction signal amplified by said second amplifying circuit, the reproduction signal amplified by said third amplifying circuit being provided to said reproducing circuit;
 said first and second amplifying circuits cooperatively forming a cascode amplifier, wherein a cascode connection between said first and second amplifying circuits generally eliminates an influence of stray capacitance and impedance of a circuit pattern on said flexible circuit board.

11. The information recording and reproducing apparatus as claimed in claim 10, wherein said first amplifying circuit includes an emitter grounded amplifying circuit as an output stage circuit and said second amplifying circuit comprises a base grounded amplifying circuit so that a cascode amplifier is constituted by a combination of said emitter grounded amplifying circuit and said base grounded amplifying circuit.

12. The information recording and reproducing apparatus as claimed in claim 10, wherein said second amplifying circuit and said third amplifying circuit are located adjacent to said reproducing circuit.

13. The information recording and reproducing apparatus as claimed in claim 11, wherein said base grounded amplifying circuit comprises:
- a damping resistor having a first terminal connected to said first amplifying circuit and a second terminal opposite to said first terminal;
- a load resistor having a first terminal provided with a power source voltage and a second terminal opposite to said first terminal;
- a bias voltage generating circuit generating a bias voltage; and
- a transistor having an emitter, a collector and a base, said emitter connected to said second terminal of said damping resistor, said collector connected to said second terminal of said load resistor, said base being provided with the bias voltage generated by said bias voltage generating circuit,
- wherein an output signal of said second amplifying circuit is obtained at a junction between said load resistor and said collector of said transistor.

14. The information recording and reproducing apparatus as claimed in claim 13, wherein a resistance of said damping resistor is determined so as to correct a high-frequency characteristic of the output signal of said second amplifying circuit.

15. The information recording and reproducing apparatus as claimed in claim 10, wherein said third amplifying circuit comprises a collector grounded amplifying circuit.

16. The information recording and reproducing apparatus as claimed in claim 15, wherein said collector grounded amplifying circuit comprises:
- a transistor having an emitter, a collector and a base, a power source voltage being provided to said collector, an output signal of said second amplifying circuit being provided to said base; and
- a load resistor having a first terminal and a second terminal opposite to said first terminal, said first terminal connected to said emitter of said transistor, said second terminal being provided with a common reference voltage.

17. The information recording and reproducing apparatus as claimed in claim 13, further comprising a filter circuit stabilizing the power source voltage.

18. The information recording and reproducing apparatus as claimed in claim 10, wherein said first, second and third amplifying circuits are provided for each polarity of the signal generated by said read head.

19. The information recording and reproducing apparatus as claimed in claim 10, wherein said second amplifying circuit and said third amplifying circuit are formed on said circuit board.

20. The information recording and reproducing apparatus as claimed in claim 10, wherein said second amplifying circuit and said third amplifying circuit are formed on said flexible printed-circuit board.

21. The information recording and reproducing apparatus as claimed in claim 10, wherein said second amplifying circuit and said third amplifying circuit are formed together with said reproducing circuit in a single semiconductor device.

* * * * *

UNITED STATES PATENT AND TRADEMARK OFFICE
CERTIFICATE OF CORRECTION

PATENT NO. : 6,181,501 B1　　　　　　　　　　　　　　　　　　Page 1 of 1
DATED : January 30, 2001
INVENTOR(S) : Yamazaki It is certified that error appears in the above-identified patent and that said Letters Patent is hereby corrected as shown below:

References Cited - FOREIGN PATENT DOCUMENTS,
Delete "2-152874" and insert -- 5-152874 -- therefor.

Signed and Sealed this

Fourth Day of December, 2001

Attest:

NICHOLAS P. GODICI
Attesting Officer　　Acting Director of the United States Patent and Trademark Office